United States Patent [19]
Keck et al.

[11] Patent Number: 5,153,677
[45] Date of Patent: Oct. 6, 1992

[54] METHOD AND APPARATUS FOR INTERFEROMETRIC DETECTION OF SURFACE DISPLACEMENT OF SOLIDS

[75] Inventors: Roland Keck, Düsseldorf; Bertold Krüger, Krefeld-Fischeln, both of Fed. Rep. of Germany

[73] Assignee: Betriebsforschungsinstitut Vdeh Institut Fur Angewandte Forschung GmbH, Dusseldorf, Fed. Rep. of Germany

[21] Appl. No.: 524,754

[22] Filed: May 17, 1990

[30] Foreign Application Priority Data

May 19, 1989 [DE] Fed. Rep. of Germany ....... 3916276

[51] Int. Cl.⁵ .............................................. G01B 11/02
[52] U.S. Cl. ............................... 356/358; 250/227.11; 73/655
[58] Field of Search ............... 356/358, 345, 349, 346; 250/227; 73/655, 657

[56] References Cited

U.S. PATENT DOCUMENTS

4,892,406  1/1990  Waters ................................. 356/358

OTHER PUBLICATIONS

Keck et al., "Wanddickenmessung an 1230° C. heiben Rohrluppen mit einem neuartigen Laser-Ultraschall-System" or "Wall Thickness Measurement on 1230° C. Hot Tube Loops With a New Laser-Ultrasound System", Steel & Iron, 1987, pp. 1057-1060.

Primary Examiner—Samuel A. Turner
Assistant Examiner—La Charles P. Keesee, II
Attorney, Agent, or Firm—Fleit, Jacobson, Cohn, Price, Holman & Stern

[57] ABSTRACT

The invention relates to a process and a device for the interferometric detection of surface displacements of solids, particularly in test material which is excited with ultrasonic waves, in which an illumination laser 10 radiates the test material surface 2, and a portion of the reflected light, after passing through a differing optical path length, is brought into a state of interference, while the interference is identified by an installed detector 9. In arrangements of this type known to the prior art, a very expensive apparatus and control system is needed to assure that demodulation of the reflected laser light is performed with maximum sensitivity. This is improved by the invention in that a joint illumination laser 10 is employed to operate several interferometer equipped with waveguides 5, 7, which in bundled fashion terminate in a common transmitter and receiver lens 4 positioned at a distance from the test material, from which lens detector-waveguides also emerge; here allocations which are dependent on the phase relation arise and whose signals are at the least added quantitatively and are employed to identify the ultrasonic events.

5 Claims, 2 Drawing Sheets

METHOD AND APPARATUS FOR INTERFEROMETRIC DETECTION OF SURFACE DISPLACEMENT OF SOLIDS

BACKGROUND OF THE INVENTION

The invention relates to a process of the type designated in the preamble of patent claim 1. The invention also relates to a device for implementation of this process.

Laser-ultrasound systems have already been successfully employed in measuring wall thickness during hot-rolling. This can be seen, for example, from the publication by R. Keck, B. Krüger, G. Coen, and W. Häsing, "Wall Thickness Measurement on 1230° C. Hot Tube Loops with a New Laser-Ultrasound System", Steel and Iron, 1987, pp. 1057 to 1060. This system provides for the application of a laser interferometer in which the surface motion of the test material induces a frequency modulation in the radiation of the illumination laser and the frequency and amplitude of the ultrasonic wave are contained. For demodulation, a portion of the scattered-back light is directed by a convex lens to a (velocity-modulated) interferometer, in which the received light is broken up by a beam-splitter and is brought into interference after passing through paths of varying lengths. In the process, portions of wave trains that have left the laser at different times interfere with each other. Given a constant frequency of the received laser light, the phase allocation in the interferometer remains the same, which results in a constant brightness in the detector. Due to the Doppler effect, the ultrasound causes the laser light to undergo a slight change in frequency, which results in a time lag at the point of interference. When the phases do not overlap in their original allocation, the modified phase allocations produce differing brightness values in the detector. The frequency difference caused by the ultrasound in the interfering waves is a measure of frequency and amplitude of the ultrasonic wave.

There is maximum of phase shift in the interference of those waves which are modulated in opposite directions by maximal surface velocities. There is maximum velocity in the crossovers of the ultrasonic waves. Ultrasonic waves in which the time interval between crossovers corresponds to the phase velocity difference in the arms of the interferometer are those most sensitively registered. In order to assure the highest degree of sensitivity, the apparatus requires a very expensive secondary regulating device to evaluate the arising signals in satisfactory fashion. Fluctuations in intensity due to rough surfaces in the test material or to an oblique angle of incidence of the laser light, precisely as occurs under operating conditions, must be eliminated.

Based on the above, there is a need to provide at reduced expense an evaluation of the phase allocation for the demodulation of the reflected laser light. It should be possible to use any desired portion of the brightness progression caused by the difference in two wave trains during phase displacement (which brightness progression forms the characteristic sinusoidal demodulation curve), thereby eliminating the restriction to only the steepest part of a sine curve arm at a 90° or 270° phase displacement (FIG. 4).

SUMMARY OF THE INVENTION

The present invention thus provides for the bundling of a number of interferometers (of the Michelson or Mach-Zehnder type), all of which terminate in the focal plane of the transmitter and receiver lens. In addition, the light from the partial beams of the illumination laser directed by the waveguide is projected onto the surface of the test material according to the optical laws of imagery. The reflection of the scattered light again reaches the focal plane of the transmitter and receiver lens in sufficient degree and is coupled into the waveguides from which it emerged.

The characteristic demodulation curve, which in the interference of two wave trains is characterized by the brightness progression during phase displacement, is sinusoidal. Since the inventive system does not require external control, all phase allocations in the indicated characteristic demodulation curve are possible.

The signals analyzed quantitatively are positive so that in the course of preliminary treatment of the signals there can be no cancellations through negative values on the falling sine arm. In addition, squaring the individual signals is useful, since all signal portions can then be made available as positive values.

Further objects and advantages of the present invention will become more apparent when reference is made to the following description taken in conjunction with the accompanying drawings.

DETAILED DESCRIPTION OF THE DRAWINGS

Figure 1:
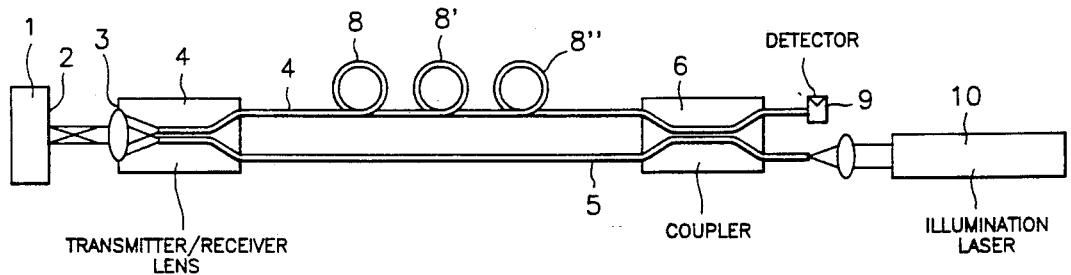
FIG. 1 illustrates a single interferometer of the type employed in the present invention.

FIG. 1 shows the test material 1, on which surface 2 the indicated ultrasound events take place. To this end, the test material 1 is subjected to excitation of ultrasonic vibrations, for which purpose an oscillator crystal can be attached. Ultrasonic waves can also be generated by means of a tunable, high-energy laser.

At a distance from the test material 1 and its surface 2, the superficial front side 3 of the transmitter and receiver lens 4 can be identified, which is jointly provided for the entire interferometer. One arm 5 of the interferometer runs directly from the transmitter and receiver lens 4 to the coupler 6, while the other arm 7 can be selectively extended over one or several of levels 8, 8', 8" before it enters the coupler 6. At the outlet of the latter, the waveguide opens into the detector 9. There are thus two different paths for the returning light before interference formation. Illumination laser 10 supplies the required laser light through one arm of the interferometer.

Figure 3:
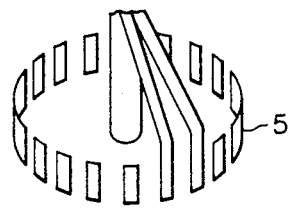
FIG. 3 is an enlarged internal view of a transmitter/receiver lens of the system shown in FIG. 2.
Figure 2:
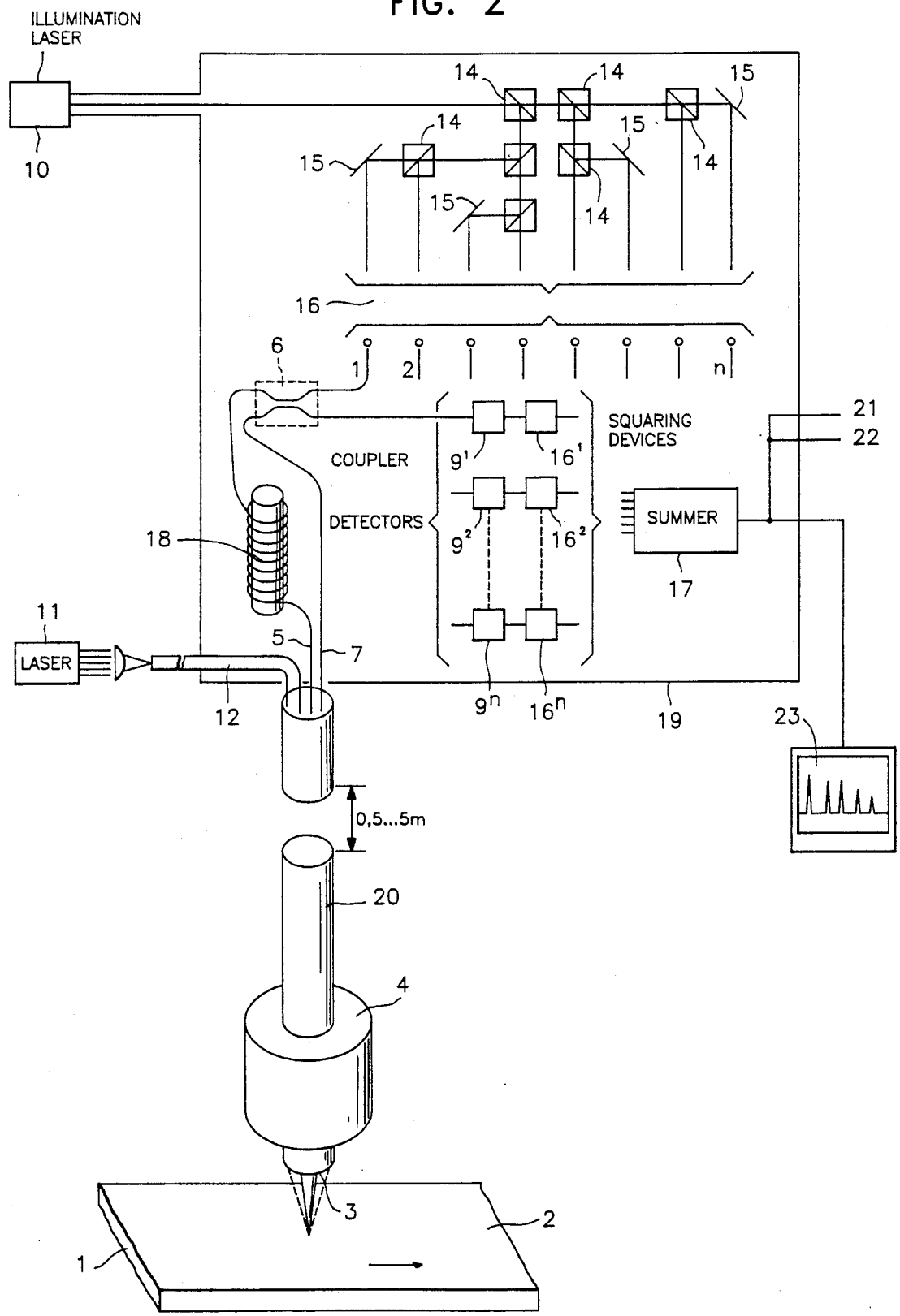
FIG. 2 is a schematic diagram illustrating the measuring according to the present invention.

The arrangement shown in FIG. 2 illustrates a laser 11, which through tunable operation generates the ultrasonic waves. To this end, the light beam of the laser 11 leads via the waveguide 12 to the shared transmitter and receiver lens 4, from whose front side 3 the light impulses emerge. The ultrasonic events occurring on the surface of the test material 1 are detected through reflection of the partial beams delivered by dividing the output beam of the illumination laser 10, as will be hereinafter described, to effectively form multiple individual interferometer paths. The arrangement can be geometrically regular, as shown in the enlarged view of FIG. 3, or it can be irregular in design. The waveguides 5 and 7 are, as already described in reference to FIG. 1, one of each being associated with each interferometer path and being arranged in pairs. The arm formed by the waveguide 5 of each interferometer passes through an optical delay in an optical delay element 18 before it enters the coupler 6.

As mentioned above, the illumination laser 10 is connected to associated optical elements to form a plurality of interferometers.

Connected to the illumination laser 10 is a network of deviating prisms 14 and deviation mirrors 15 arranged to form 8 partial beams in the depicted example, each of which displays a varying optical path length. In the coupler 16, each partial beams is coupled to a dedicated waveguide 5, though only one is shown. Each waveguide 7 picks up at the reflected laser light couple with waveguides 7 before terminating at the detectors to 9'-9'', a plurality are provided even though only one is shown. Squaring devices 16'-16'' etc., so that absolute amounts do not have to be formed, but rather squared amounts are available. In either case, negative and thus cancelling values are excluded. The squaring devices 16'-16'' are switched to a summer 17, whose output permits further signal processing in a manner known in the art by means of a monitor or data processing.

The optics and electronics of the inventive device are positioned within a protective casing 19 provided with inlets for the illumination laser 10 and for the laser 11 for excitation, whereas the various waveguides project from the casing and are clad with a protective tube. The signal outlets 21 and 22 are for data processing, while direct signal display is performed by the monitor 23.

The above description is intended by way of example only and is not intended to limit the present invention except as set forth in the following claims.

Figure 4:
FIG. 4 illustrates the realization of detector signals capable of being added for optimal sections of the interferometers characteristics.
Figure 4:
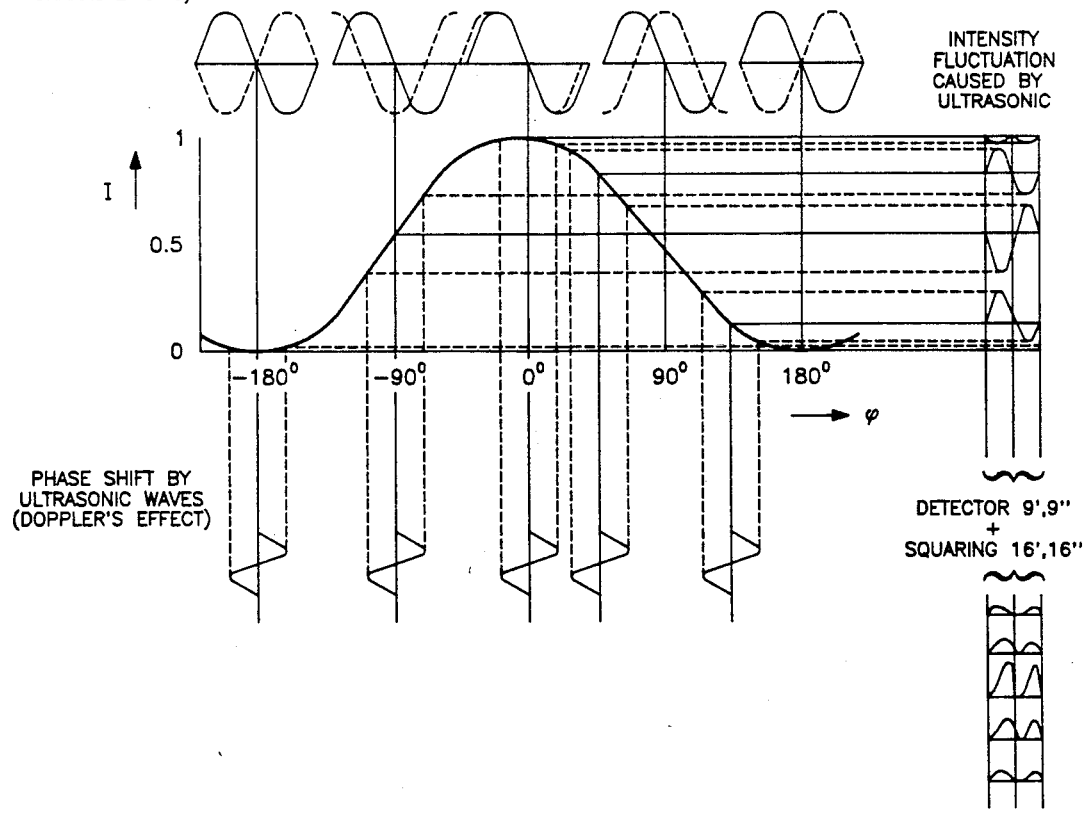

FIG. 4 shows the realization of the signals. The ultrasonic events appearing on surface 2 of the test material result in phase-shiftings of the light waves which in couples 6 corresponding the cases I to V at different spots of the interferometers sine characteristic result in the fluctuations of intensity corresponding in the case I to V. These fluctuations of intensity are transferred into electrical signals by the detectors 9', 9'', since after squaring 16', 16'' said signals are of positive polarity all, I'' to V''', they may be added to result in a common signal.

Thus, it is clear from FIG. 4 that the signal processing is not limited to a phase shift angle of 90° respectively 170°, but within the total area of phase shift, so that the us-signals are used to much greater extent.

We claim:

1. A method for the interferometric detection of surface displacement in solids, particularly of ultrasonic events on the surfaces of test material, in which an illumination laser radiates the surface of the test material and a portion of the reflected light, after passing through two differing optical path lengths, is brought into a state of interference and a detector (9) is installed to identify such interference, comprising the steps of:

dividing the outlet beam of the illuminating laser into several individual beams, each of which strikes the test material surface at a common measuring point by means of waveguides;

providing an individual interferometer for each beam divided from the outlet beam;

providing positioned receptors and pairs of detector waveguides for each interferometer, the detector waveguides in each pair having a different optical path length for providing a time difference, the reflected light from the test material surface striking the positioned receptors;

allocating the light waves in each pair of detector waveguides through fanning in, independent of the phase relation, to generate detection signals; and adding detection signals for each pair of detecting waveguides.

2. The method as defined in claim 1, wherein the detection signals are squared before being added.

3. The method as defined in claim 1, wherein the detection signals are totalled and employed for the identification of the ultrasonic events on the test material surface events.

4. Device for implementation of the method defined in claim 1, wherein one arm of an interferometer leads from the illumination laser to a transmitter and receiver lens, which is positioned at a distance from the test material surface, and a fan-in arm leads to a detector, and an alterable path length for one arm being provided by means of which the arms are optically coupled, the arms being designed as waveguides with a joint transmitter and receiver unit and are combined in a bundle which terminates in the transmitter and receiver lens.

5. Device as defined in claim 4, wherein the illumination laser is provided with a multiple beam splitter equipped with deviating prisms and deviation mirrors for the optical connection of the variously long partial beams to the waveguides of each individual pair.

* * * * *